United States Patent Office 2,946,706
Patented July 26, 1960

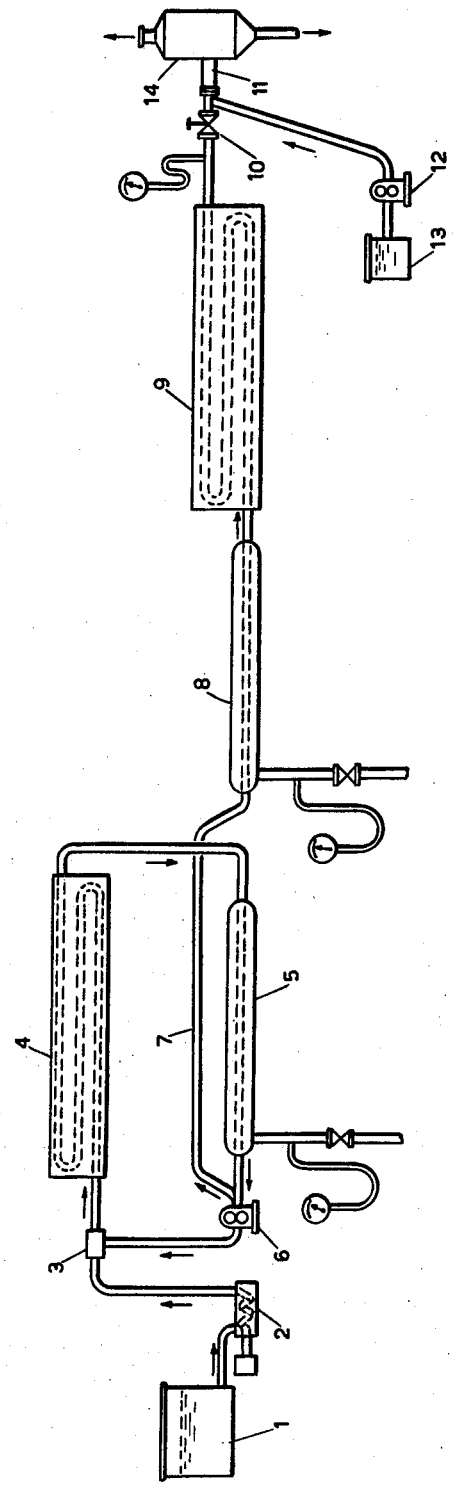

2,946,706

PROCESS FOR THE HYDROLYZATION OF STARCH AND OTHER POLYSACCHARIDES

Edmund F. Boon and Laszlo Vahl, Delft, and Wouter G. Kingma, Amsterdam, Netherlands, assignors to Werkspoor N.V., Amsterdam, Netherlands, a company of the Netherlands Filed Aug. 14, 1956, Ser. No. 604,032

Claims priority, application Netherlands Aug. 29, 1955

4 Claims. (Cl. 127—38)

This invention relates to a process for the hydrolyzation of starch and other polysaccharides, in which an acidified suspension of the polysaccharide at such a pressure, that the suspension does not boil, is continuously passed through a heater and a reactor, in which a temperature of more than 100° C. is maintained and a mixture of dextrins, polysaccharides and monosaccharides is formed.

With a known process of this kind the suspension of the starting material is forced by a pump, preferably in a pulsating flow through the heater and brought through the gelatinous phase therein. In the heater the suspension during its passage through the gelatinous phase comes in contact with heated walls, the temperature of which, due to the bad transmission of heat, is considerably above the temperature of the suspension and amounts to about 165° C. if a temperature of about 150° C. is required for the hydrolyzation of the suspension. Only by using a heater having a very large heating surface can the temperature of the walls approach a value of 150° C. In the liquid film contacting the heated walls of the heater said high wall temperature can give rise to undesired color formation in the final product by overheating of the suspension. Moreover the degree of conversion of the suspension will not be the same throughout the mass due to incomplete mixing of the material in the heater, so that no uniform product will be obtained.

The invention has for its object to remove the above mentioned drawbacks and to this end the suspension under treatment is passed in a cycle through the heater and the reactor, fresh suspension being continuously introduced into the cycle between the outflow side of the heater and the inflow side of the reactor in such a manner that the fresh material thus introduced will pass through the gelatinous phase before entering the heater and hydrolyzed product being continuously withdrawn from the cycle.

In the cycle embodying this invention, a thorough mixing of the introduced suspension and the circulating hydrolyzed product takes place and the latter has a high temperature with respect to that of the freshly supplied suspension. By using a large ratio of mixture of the circulating hydrolyzed product to the quantity of fresh suspension introduced into the cycle, the temperature of the hot circulating mass will be reduced a few degrees only, about 10° C. at the most, by the addition of the cold fresh suspension. The fresh suspension supplied to the cycle will now pass through the gelatinous phase in a fraction of a second only and it does not come into contact with the hot walls of a heater. The temperature of the mass circulating in the cycle may be maintained at such value that the mass, by passing through the reactor, has already obtained such a low viscosity that the heating in the heater may be carried out without taking particular precautions.

The process for the hydrolyzation of starch and other polysaccharides may, according to the invention, be further improved by leading the hydrolyzed product withdrawn from the cycle again through a second heater and a reactor in series with the first mentioned heater, a final hydrolyzation taking place in the second reactor at a temperature higher than the temperature of the mass circulating in the cycle. Thereby the hydrolyzation of the mass in the cycle may be more incomplete, so that a lower temperature may be maintained in the cycle. Due to said lower temperature the influence of the relatively long stay of the mass in the cycle is reduced and the formation of undesired coloured compounds and reversion of the hydrolyzed product into other polymers is avoided.

In the accompanying drawing a plant for carrying out the process according to the invention is diagrammatically illustrated.

From the receptacle 1 the acidified starch suspension is pumped by a dosage-pump 2, for example, a two stage monopump into a mixing chamber 3, which is located in a cycle, comprising a reactor 4, a heater 5 and a circulating pump 6, for example, a gear pump or a centrifugal pump. The heater 5 may consist of a single tube or a bank of tubes, surrounded by a jacket. The reactor 4 may consist of a single tube which is insulated against heat losses, so that the starch liquor retains its temperature in said heater. The freshly introduced starch liquor is forced into the mixing chamber 3 through a slot-shaped opening with a high velocity into the circulating mass, which with a smaller velocity flows along said slot and is already preliminary hydrolyzed in the reactor 4, whereby higher and lower dextrins and polysaccharides are formed. Said circulating mass takes up the fresh starch particles in finely divided state.

Behind the heater 5 a quantity of liquor equal to the amount of freshly introduced starch liquor is withdrawn from the cycle by the conduit 7. The conduit 7 leads the mass through a second heater 8 and subsequently through a second reactor 9, in which the final hydrolyzation takes place. The hydrolyzed product is introduced into a neutralization chamber 11 through an expansion valve 10 and a soda solution for neutralizing the mass is continuously supplied to the chamber 11 from a receptacle 13 by a pump 12. The neutralized solution subsequently flows into a flash evaporator 14, in which a low pressure is maintained, so that liquid is evaporated and the mass is also cooled.

It is to be noted that, in initially starting the described plant, the valve 10 is closed while the pump 2 is operated to fill the cycle. The rate of flow of the liquid in the reactors 4 and 9 preferably should have such a value that all particles of the starch liquor move with nearly the same velocity so that partial back flow cannot occur. The required duration of stay of the suspension in the reactor 4, and, therefore, the length of said reactor in the cycle depends on the selected conversion temperature and should be as short as possible so that a compromise has to be made between the conversion temperature and the duration of stay.

In the whole circuit between the pump 2 and the valve 10 a pressure is maintained which is higher than the pressure of the boiling point corresponding to the temperature of the mass after leaving the heater 8.

By way of example it may be stated that 1000 kg. starch liquor at 22° Baumé, to which is added 0.07% HCl, is pumped per hour into 10,000 kgs. preliminary hydrolyzed solution of 132° C. The pressure in the circuit is 10 kgs. per cm.$^2$. By adding the fresh starch liquor the temperature of the mass in the mixing chamber decreases to 123° C., but the mass is reheated in the heater 5 to 132° C.

In the heater 8 the hydrolyzed mass withdrawn from the cycle by conduit 7 is heated to 150° C. In the neutralization chamber 11 the liquor expands to a temperature of about 85° C. and with said temperature the liquor enters the flash evaporator 14.

It is to be noted that the invention is not limited to the example described above. Thus in particular, circumstances it may be desired to arrange between the heater 5 and branching of the discharge conduit 7 a further reactor so that the mass after being heated in the heater 5 is subjected to a further hydrolyzation at a somewhat higher temperature before entering the mixing chamber 3.

What we claim is:

1. A process for the hydrolyzation of starch and other polysaccharides involving the use of a heater and reactor comprising passing an acidified suspension of a polysaccharide sequentially through the heater and reactor for successive heating operations, repeatedly recycling the fluid from the reactor to the heater and back through the reactor, adding fresh suspension between the reactor and heater, and heating the fresh suspension to pass the same through the gelatinization stage by the heat of the recycled fluid.

2. A process as claimed in claim 1 comprising tapping off a portion of the recycled fluid.

3. A process as claimed in claim 2 comprising adding the fresh suspension in an amount which avoids materially affecting the temperature of the recycled fluid.

4. A process as claimed in claim 1 comprising heating the tapped suspension to a temperature above that of the recycled fluid.

References Cited in the file of this patent

UNITED STATES PATENTS

| | | |
|---|---|---|
| Re. 13,592 | Lillie | July 8, 1913 |
| 1,183,408 | Sovereign | May 16, 1916 |
| 1,320,719 | Stutzke | Nov. 4, 1919 |
| 2,233,243 | Burns | Feb. 25, 1941 |
| 2,359,763 | Horesi | Oct. 10, 1944 |
| 2,516,884 | Kyame | Aug. 1, 1950 |
| 2,734,836 | Elian | Feb. 14, 1956 |
| 2,735,792 | Kroyer | Feb. 21, 1956 |